United States Patent [19]

Anderson et al.

[11] 3,817,100

[45] June 18, 1974

[54] CRITICAL FLOW VENTURI

[75] Inventors: Richard D. Anderson, Southgate;
Nicolas A. Azelborn, Ypsilanti;
Wallace R. Wade, Farmington, all of Mich.

[73] Assignee: Ford Motor Company, Dearborn, Mich.

[22] Filed: Nov. 3, 1972

[21] Appl. No.: 303,584

[52] U.S. Cl. ................................. 73/213, 73/421.5
[51] Int. Cl. ............................................. G01f 1/00
[58] Field of Search ... 73/23, 28, 113, 213, 421.5 R

[56] References Cited
UNITED STATES PATENTS
3,603,155  9/1971  Morris et al. ................. 73/421.5 R

*Primary Examiner*—Richard C. Queisser
*Assistant Examiner*—Stephen A. Kreitman
*Attorney, Agent, or Firm*—Keith L. Zerschling; Joseph W. Malleck

[57] ABSTRACT

An apparatus for determining the total mass of exhaust gas constituents emitted from an internal or external combustion engine, the apparatus having a through-flow duct to receive the exhaust gases and into which is introduced dilution air for thorough mixing with the exhaust gases. The apparatus has means for measuring not only the total mixed flow but also the total flow of dilution air introduced to the duct. Unique means is utilized for extracting and measuring a proportional sample of said mixed flow. Collection and measuring apparatus is used to determine the concentration of dilution air constituents as well as the combined concentration of gaseous constituents in the mixed flow. Utilizing the above two flow measurements and the two constituent concentration measurements, the total mass of exhaust gas from the engine is simply determined on a theoretically correct basis.

8 Claims, 1 Drawing Figure

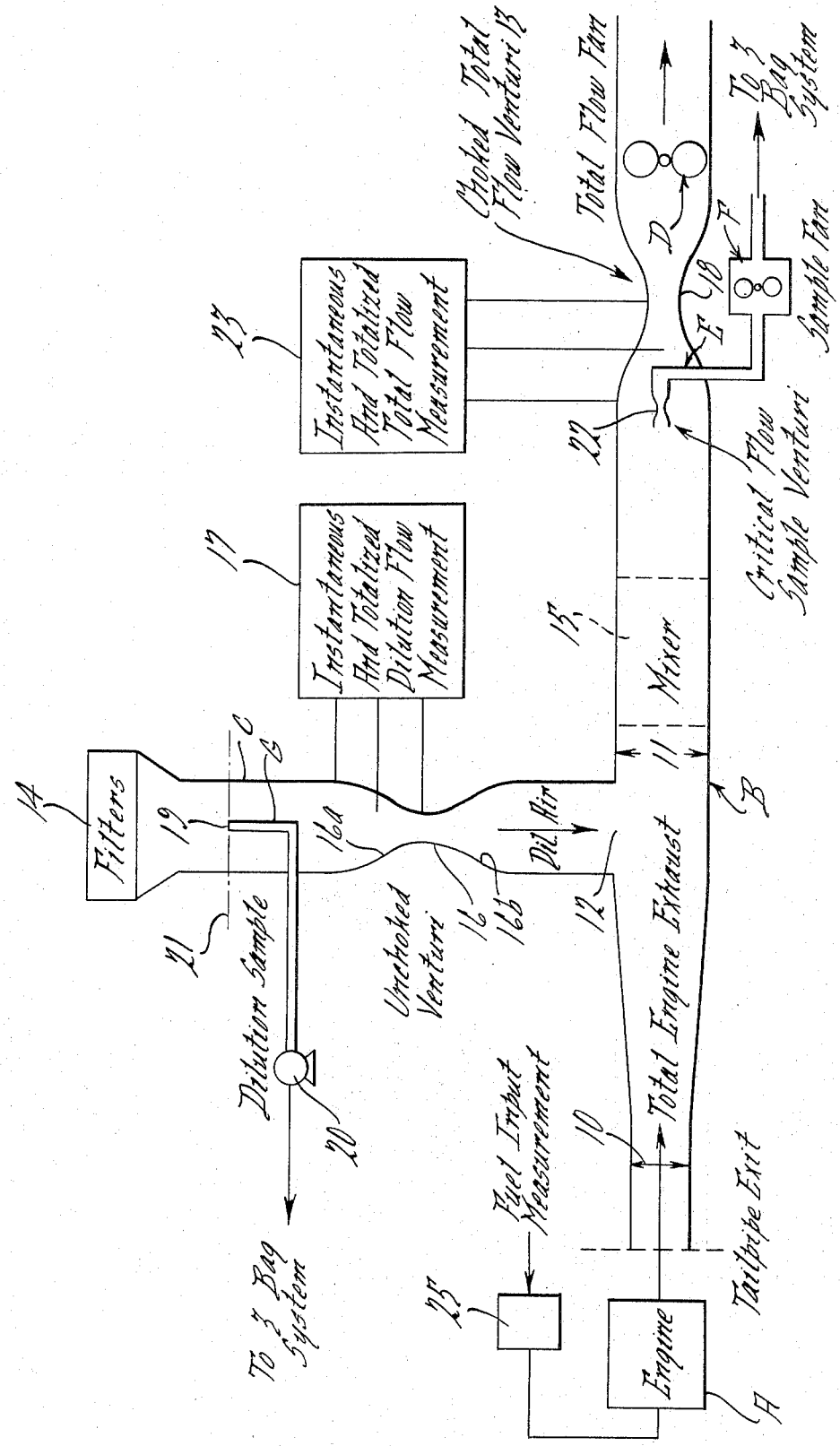

CRITICAL FLOW VENTURI

BACKGROUND OF THE INVENTION

Current governmental test procedures for determining the certification of automotive engines, are directed to the needs of a reciprocating engine and thus a low volume emission system. In the course of such test procedures, emissions are collected in receptacles, such as bags usually accompanied by the addition of dilution air to prevent condensation of certain gaseous elements insuring their availability for analytical study. In order to relate a collected amount of emissions to a specific period of engine operation in a simple manner, several bags are used. To insure the bags hopefully represent the total exhaust emissions, proportionality should be insured. To this end, Federal test procedures have required that the apparatus be of a constant volume type. Under the current state of knowledge, a constant volume system can only be achieved by regulating temperature and pressure as well as flow. Mechanisms, such as heat exchangers, have become necessary and limiting appendages. The Governmental testing procedure, although satisfactory for the low mass flow of the reciprocating engine, is not suitable for high volume systems such as a gas turbine engine.

In addition, certain assumptions made with a low volume system, such as the assumption of input dilution air as being pure and uncontaminated for certain calculations is not valid for a high volume system. In another way, the Federal test procedures assume, for a part of its calculations, that dilution flow is equal to the total mixed flow and thereby assume exhaust flow is zero. This assumption results from the inability of Federal test procedures to measure dilution air flow and substitute therefore total mixed flow in certain calculations. This introduces an amount of error that cannot be tolerated in high volume test systems.

SUMMARY OF THE INVENTION

Accordingly, a primary object of this invention is to provide a system for determining mass emissions which is particularly capable of functioning with high volume as well as low volume flows. To this end, the invention contemplates the provision of an apparatus which extracts a truly proportional flow sample from a thru-duct, the duct receiving both exhaust gases and dilution air. Proportionality is obtained by providing a choked flow restriction (such as a venturi) which creates a zone of known flow conditions for total mixed flow. Sampling apparatus is adapted to extract a small portion of the flow within this zone through a similar choked venturi, to complete the proportionality and identity of inlet flow conditions. Thus, pressure and temperature vary in absolutely the same way for the inlets to the sampling venturi and total mixed flow venturi.

Although the flow through the choked flow zone can and does change during a test cycle, the proportionality between sampled flow and the primary mixed flow is maintained the same at any one moment. From the total emission concentration levels derived from an analysis of the sampled gas, there must be subtracted the mass emission levels added by the dilution air. Since the dilution air requirements will vary across a broad range during the test cycle, the flow measuring mechanism must meet rather stringent conditions. To this end a preferred use is made of a hot wire anemometer. Equivalent measuring devices may comprise a truly unchoked venturi or a vortex shedding measuring device.

A unique combination is presented by the use of dilution flow measuring apparatus and the novel placement of parallel choked venturis, to make the system more accurate in determining mass emission from a high volume flow engine (such as a gas turbine) as well as low volume engines.

Other advantages of the inventive system comprise: (a) a system which has no moving parts critical to the system calibration, thus providing for greater reliability; (b) the system can accommodate a wide range of engine sizes by merely changing the size of the choked venturis restricting the mixed flow; (c) an optional characteristic is the elimination of total mixed air flow measurement and the substituted use of a fuel flow measuring device, the alternative system can be dimensioned for a minimum dilution to maintain the largest possible collection bag concentrations particularly useful for turbine engines; and (d) the system is relatively low in cost because of the elimination of attendant mechanisms such as a heat exchanger and the elimination of critical air blowing devices to maintain appropriate constant volume.

SUMMARY OF THE DRAWINGS

FIG. 1 schematically depicts the inventive system as adapted to measuring the mass emissions from a gas turbine engine.

DETAILED DESCRIPTION

The mass emission measuring system of this invention is designed to operate particularly with a high volume flow engine A (flows on the order of 2–4 lbs./sec. are experienced with a gas turbine engine). However, this invention is equally applicable to low volume engine systems, but the improvement in measuring accuracy is not as sizable, as will be explained later. Exhaust gases are conducted into a through-flow duct B; the duct has a diameter 10 located adjacent to the engine which connects or tapers to a larger diameter 11 located adjacent the station 12 for introducing dilution air. A variable amount of dilution air is drawn from the surrounding atmosphere through a passage C having an optional filter at its entrance mouth 14. Dilution air is important to the system because it prevents the condensation of moisture which would distort accurate analysis. Both the dilution air and the exhaust gases are homogeneously mixed by conventional apparatus designated 15, such as baffles or vanes or equivalent vortex mixers. The total mixed flow is positively drawn through the duct B by a primary constant speed fan D (drive means) sized to accommodate high volume and large mass flows. To make gas constituent analysis practical, only a sample of the total flow is utilized and is extracted through a sampling passage E having its own independent constant speed fan F for drawing a sampling flow therethrough. Similarly a sampling probe G is utilized to extract a portion of the dilution air flow.

The determination of the total mass emissions of the engine requires four basic quantitative measurements (a) the total flow (volume) of both the mixed flow as well as the dilution air flow, and (b) the concentration (parts per million) of the various gas constituents in both the dilution air as well as the total mixed flow. This system proceeds on the principle that the concentration measurements will be made upon a sampled portion of the flow, whereas the flow measurement is made directly to the total flows. Proportionality, therefore must be insured between the sampled flow and the total mixed throughflow to allow for this determination.

In more particularity, the through-flow duct B is designed to accept all of the vehicle exhaust flow which typically is about 2–4 lbs. per second at atmospheric pressure and ranging in temperature from 100° to 500° F. The exhaust gas, of course, will fluctuate in flow as determined by engine operation itself and thus there will be experienced moments of extremely low exhaust rates. Dilution air input is allowed to enter the system in opposite proportions to a change in flow of exhaust gas to assist in producing a downstream zone of known flow conditions through the use of a choked restriction 18. Then, to create a condition of proportionality for extraction of a sample from the flow, the invention contemplates utilization of another choked restriction 22 having an inlet optimally at the precise inlet of restriction 18. The choked condition is preferably achieved by utilization of a venturi, sized and related to a fan drawing flow therethrough. Choked flow is here used to mean a flow which achieves Mach I at the throat of the venturi; at this condition the fan is unable to pull any more flow through the restriction than a maximum amount, as determined by the venturi throat opening.

To accommodate varied amounts of dilution air to assist in achieving a choked flow condition at the restrictions, the dilution air passage is constructed to offer unhindered passage; air is admitted in an amount to make up a combined mixed flow which will be typically at least 2 lbs. per second in order to be larger than the maximum engine exhaust flow. Under fluctuating conditions of the exhaust gas, the dilution air will be drawn in under rather widely ranging limits, typically between 10 and 100 percent of total flow (the latter is a start up condition). Dilution air flow is preferably measured by the use of a hot wire anemometer or other device 16. In FIG. 1, an equivalent structure in the form of a venturi restriction is used. The restriction is sized to be consistently unchoked under all conditions of the test cycle. Associated with the unchoked venturi restriction is appropriate flow measuring equipment 17 having electronics for calculating instantaneous and totalized dilution flow according to conventional principles. An optional dilution air filter assembly 14 is utilized for the purpose of removing as much solid matter as possible and provide for background hydrocarbon stabilization as prescribed in current Federal Regulations, such as cited in the Federal Register, Volume 36, No. 128, entitled "Exhaust Emission Standards and Test Procedures" part II. The filter is typically made of activated charcoal, but is not critical to the system, except as required by said Regulations. The filter and passage C must be of sufficient capacity to carry the dilution air at a pressure not more than one inch of water below ambient (at station 12) when the mass emission measurement system is operating at its maximum flow rate. The total pressure drop across the dilution air filter and the dilution air flow measuring device must be maintained within one inch of water pressure according to Federal Regulations.

Another equivalent and alternative mode of measuring dilution air flow can be by way of the interposition of a tubular shaft (or protuberance) in the flow, such as an Eastech flow element. The vortex swirls shed by the shaft is an indicia of the rate of flow.

Flow measurement for the total mixed flow is obtained by conventional flow measuring equipment 23 used with the primary flow restriction at 18. A venturi restriction is employed because it importantly accomplishes two things: it facilitates a choked flow condition and provides a convenient mechanism for precisely measuring the flow rate. The venturi flow meter apparatus is by far the most common type in general use because it is based on the law of conservation of energy. Such law requires that the total energy at any given point in a stream is equal to the total energy at a second point in the stream, neglecting losses between the points. While it is possible to convert pressure (potential energy) to velocity (kinetic energy) and visa versa, the total amount of energy does not change. By use of a restriction in the passage, such as a venturi tube, a portion of the potential energy of the stream is temporarily converted to kinetic energy as the fluid speeds up to pass through the restriction of the venturi. A secondary device measures the change of energy as a pressure difference, which is related to flow by a simplified known equation typically carried out by an electronic package. Although the venturi restriction has the advantage of introducing less permanent loss pressure than other mechanisms such as an orifice plate, it has the more important advantage that the converging inlet cone 16a permits dirt to be flushed through it in conjunction sonic flow.

Fan D maintains a typical pressure drop across the venturi 18 of about 20 inches of $H_2O$. (This system does not require a 2/1 pressure ratio). Fan D need not be of a critical constant speed type as required by earlier systems.

To obtain a dilution air flow sample, probe G is placed in a central location of the dilution air passage C so as not to interrupt substantially the flow therethrough; the mouth 19 of the probe is directed upstream. A constant speed pump 20 is used for extracting the dilution air sample and it is here shown as being extracted at a longitudinal station 21 upstream from the flow measuring apparatus 16 and 17. The rate of flow of the sampled dilution air through mouth 19 should be about 10 cubic feet per hour, as specified in Federal Regulations presently.

To obtain true proportionality in the sample of the total mixed flow, a pair of parallel flow venturis 18 and 22 are critically related to each other. Fan D and F are oversized and respectively positioned downstream of each venturi to provide sufficient suction to insure continuous choked flow. The parallel venturis 18 and 22 are positioned to insure that the inlet temperature and pressure conditions of the sample flow are simultaneously identical to the inlet temperature and pressure conditions of the total mixed flow. To obtain the accuracy of this invention that is contemplated, the inlet to restriction 22 must be placed exactly in the plane of the inlet to restriction 18. An inlet is defined to mean the point or plane in which flow begins to accelerate or the flow diameter begins to decrease. Although this invention contemplates placing the inlet to restriction 22 slightly off the plane of the inlet to restriction 18, ultimate accuracy and proportionality will be decreased accordingly. A minimum proportional sample flow rate should be about 10 cubic feet per hour, and is adapted to be approximately 1 percent of the total mixed flow. The percentage is compatible with duration and collection capacity.

To obtain quantitative determinations of the gas constituent concentrations, the bag collection technique is used as outlined in the Federal Regulations, such as in the publication, volume 36 of the Federal Register, Volume 37 No. 10 dated Jan. 15, 1972. A practical sample of flow is taken and entrained in the three bags progressively; a normal six-bag collection system is here used (three background bags for the dilution air and three total mixed-flow bags). Conventional laboratory analysis may be used to determine the specific concentration of gas constituents which are problem polluters, such as carbon monoxide, hydrocarbons and oxides of nitrogen.

To obtain analysis of oxides of nitrogen, a chemiluminescence principle may be used whereby nitric oxide (NO) is reacted with ozone ($O_3$) to give nitrogen dioxide ($NO_2$) and oxygen (O). $NO_2$ is then electronically excited to yield a detectable light emission. The intensity of this emission is proportional to the concentration of NO into the reactor. The light emission can be measured utilizing a photomultiplier tube and associated electronics.

To obtain an analysis of carbon monoxide, an infrared analyzer is typically used to select and determine the specific gas specie of interest. Infrared radiation, passing through a sample cell is absorbed by the component of interest only in the regions where that component has infrared absorption bands. The percent of radiation absorbed is proportional to the concentration of the component of interest in the sample. Due to the difference in gases between a reference cell and the sample cell, the amount of energy entering the detector from the reference cell is greater than the amount of energy entering the sample side of the sample cell. At the end of each of these cells, a closed container consisting of two sealed compartments of equal volume separated by a flexible metal diaphragm. Both compartments are filled with the gas of the component of interest. The infrared radiation, which passes through the reference cell, enters one compartment of the detector, while the radiation passing through the sample cell enters the other compartment. The gas in each compartment of the detector is heated by the incoming energy. Heating of the gas in the detector causes the pressure in the two compartments to rise. The pressure rise is greater in the compartment receiving the radiation from the reference cell since a portion of the radiation transmitted through the sample cell has been absorbed by the component of interest before entering the other compartment. When the component of interest is carbon monoxide, the infrared absorption band is 4.6 microns and will absorb only that infrared radiation as its own unique infrared absorption wave length.

To obtain an analysis of hydrocarbons, an apparatus may be used which depends on the flame ionization method of detection. The sensor is a burner where a regulated flow of sample gas passes through a flame sustained by a regulated flow of air and a premixed hydrogen/diluent fuel gas. Within the flame, the hydrocarbon components of the sample stream undergo a complex ionization that produces electrons and positive ions. Polarized electrodes collect these ions, passing current to flow through electronic measuring circuitry. Current flow is proportional to the rate at which carbon atoms enter the burner.

To determine the grams/vehicle mile of one or more gas constituents emitted by the gas turbine engine, the following calculations are made for each bag and for each specie or constituent. From the mathematical product of [the total mixed flow ($Ft^3$/per test period)$_x$ constituent concentration (ppm)$_x$ constituent partial density (grams/$Ft^3$)] is subtracted the product of [the dilution air flow ($Ft^3$/test period)$_x$ constituent concentration in the dilution air flow (ppm)$_x$ the constituent density (grams/$Ft^3$)]. The result is total grams (mass) of a specie emitted during the test period. This is then divided by the known mileage for the period (typically 7.5 miles) to obtain grams/vehicle mile. The flow and concentration quantities are obtained from the test apparatus of this invention. Density is a known quantity for the typical types of constituents to be measured, such as CO, $NO_x$ and HC. Background contamination is accurately corrected for in the above determination.

As an alternative in the determination, a fuel based calculation may be made by substituting the total fuel consumed during the test cycle (such as by conventional measuring means 25) for the total mixed flow passing through duct B. To make the determination, the constituent concentration is ratioed to the resultant sum all carbon-containing constituent concentrations. This ratio is then multiplied by (1) the total fuel consumed, (2) specific gravity of the fuel, and (3) the ratio of molecular weight of the specie to molecular weight of the fuel. This same mathematical analysis must be made for the amount of background contamination contained in the dilution air and is thus subtracted to produce the total grams of emissions during any one test period.

Among other factors, considerable error is introduced by prior art methods and apparatus through the failure to appreciate the need for dilution air flow measurement. To illustrate, assume the total mixed flow (at 200 ppm of a specie) is comprised of 80 percent dilution air (at 10 ppm of the specie) and 20 percent of exhaust gas (at $x$ ppm). Then when determining the emitted mass (in grams) of the specie by prior art methods, the only flow measured (total mixed flow) is multiplied by the difference in concentration between the mixed flow and dilution air (200-10) and then by density. This determination is fallacious in that it assumes dilution air flow is equal to the mixed flow. When dealing with low volume engines, the percentage of dilution air is so great that error is minimal. But in high volume systems, such as a gas turbine engine, dilution air flow is only a fraction of the total mixed flow and thus the error can be considerable.

We claim as our invention:

1. In an apparatus useful in determining the total mass of exhaust gas constituents emitted from an engine, the apparatus having a through-flow duct to receive the exhaust gases and into which is introduced dilution air in a manner to mix with the exhaust gases, the apparatus having means for measuring the total mixed flow and having means for measuring the concentration of constituents, an improvement in said apparatus comprising:
   a. means for extracting and measuring a truly proportional sample of said mixed flow for determining the combined concentration of gaseous constituents in said mixed flow, b. means for measuring the total flow of dilution air introduced to said duct, whereby a determination of the mass of gaseous constituents emitted by said engine for a predetermined period will be obtained by taking the product of the mixed flow, constituent concentration in the mixed flow, and the constituent density, and then subtracting the product of dilution air flow, constituent concentration in said dilution air flow, and the constituent density, said determination being independent of variations in the flow rate, flow temperature or flow pressure in either of said dilution air or exhaust gases.

2. The improvement of claim 1, in which the proportional measuring means comprises:

a. a flow restriction in said duct, b. drive means for drawing said mixed flow through said restriction at a rate effective to achieve at least a substantially choked flow condition, and c. a sampling passage for extracting a proportional quantity of mixed flow from said duct and having an inlet disposed in a region of said duct where substantially choked flow conditions exist.

3. The improvement as in claim 2, in which the means for measuring dilution air flow comprises a protuberance interposed in the dilution air flow and a sensing mechanism for determining the degree of flow vortex shed by said protuberance.

4. The improvement as in claim 2, in which the means for measuring dilution air flow comprises a venturi restriction operating upon said dilution air flow and having a throat area of sufficient size to provide for continuous unchoked flow therethrough, and a sensing mechanism for determining the degree of potential energy converted to kinetic energy by the venturi restriction thereby providing for determination of the flow therethrough.

5. The improvement as in claim 1, in which said through-flow duct is arranged to convey mixed flow at a rate no less than 1.5 lbs. per second.

6. The improvement as in claim 2, in which said sampling passage additionally contains a second restriction, and means for drawing sampled flow through said second restriction at a rate to achieve substantially choked flow conditions, said first and second restrictions being in parallel.

7. The improvement as in claim 1, in which said apparatus has a fuel measuring means substituted for the measuring means of the total mixed flow passing through said duct, whereby the mass of an exhaust gas constituent can be computed by determining the constituent concentration from said proportional measuring means, ratioing the resultant to the sum of all carbon-containing constituent concentrations, and multiplying said ratio by the total fuel consumed, specific gravity of fuel, and by the ratio of the molecular weights of the constituent to fuel, and then subtracting the mass of the constituent contained dilution air as calculated by the same mathematical procedure.

8. A system for measuring the total mass of certain gaseous constituents emitted by a gas turbine engine during a predetermined test cycle, the system comprising:

a. a through-flow duct effective to receive all exhaust gases emitted by said engine, b. a dilution air passage effective to introduce a variable amount of dilution air into said duct as required by the flow conditions in said duct, c. means in said duct for homogeneously mixing said dilution air and exhaust gases, d. a pair of parallel arranged venturi restrictions in said duct, one located so as to operate upon said total mixed flow for converting a portion of the flow potential energy to kinetic energy, and the other located so as to operate upon a sample of said mixed flow no greater than 2 percent thereof, each venturi restriction having a flow entrance arranged and related to the other so as to obtain accurate proportionality between the respective flows passing therethrough, e. means to maintain a choked flow condition through each of said venturi restrictions, f. means for measuring the total flow of each of said dilution air and said mixed flow for said test cycle, g. means for determining the concentration of a selected gaseous constituent present in the flow passing through said sampling restriction and in the dilution air flow introduced through said duct.

* * * * *